B. F. KESSLER.
Wheel-Cultivator.
No. 52,053. Patented Jan. 16, 1866
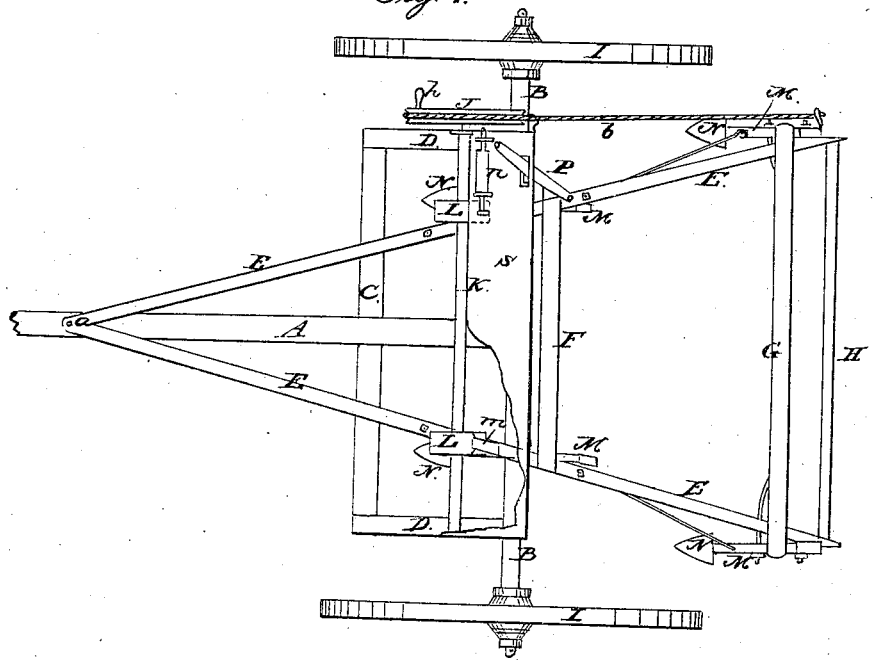
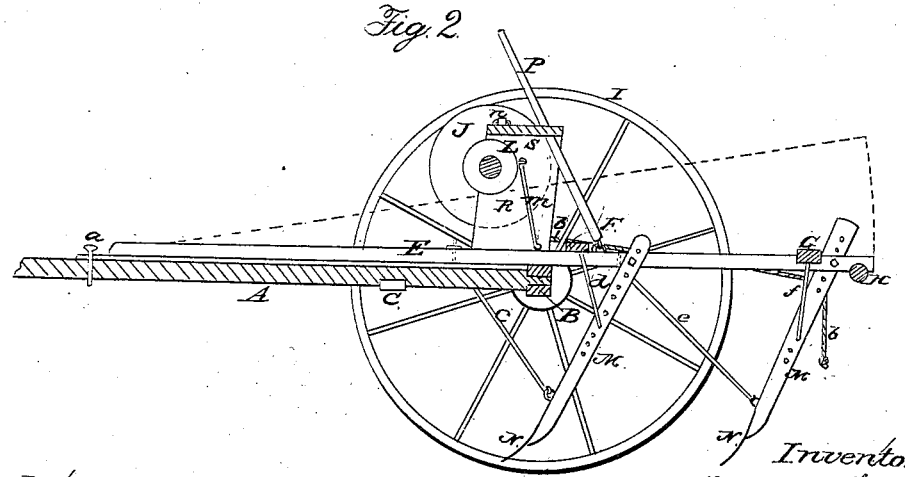

UNITED STATES PATENT OFFICE.

BENJAMIN F. KESSLER, OF WILMINGTON, ILLINOIS.

IMPROVEMENT IN CULTIVATORS.

Specification forming part of Letters Patent No. 52,053, dated January 16, 1866.

*To all whom it may concern:*

Be it known that I, BENJAMIN F. KESSLER, of Wilmington, in the county of Will and State of Illinois, have invented a new and useful Improvement in Cultivators; and I do hereby declare that the following is a full, clear, and exact description of the same, reference being had to the accompanying drawings and the letters and figures marked thereon, which form part of this specification.

In said drawings, Figure 1 represents a plan or top view of my invention, and Fig. 2 a vertical section of the same at the line $x$ in Fig. 1.

Similar letters of reference in the different figures denote the same parts of my invention.

To enable those skilled in the art to understand how to construct and use my said invention, I will proceed to describe the same with particularity, making reference in so doing to the aforesaid drawings.

A represents the tongue or draft-pole of the machine, the rear end of which is firmly mortised or otherwise attached to the axle B, upon the ends of which are arranged the wheels I.

C D represent a frame rigidly attached to the axle B, the cross-bar $c$ lying beneath the draft-pole A, as shown, and rigidly connected thereto by a bolt or other suitable mode.

At each side of the machine there are arranged the vertical supports R for the seat S, where the driver may be seated when the machine is in operation.

E E represent the plow-beams, arranged as shown, their front ends being joined together and attached to the draft-pole at $a$ by a pivot or bolt, which allows a free lateral movement to said beams, and also a vertical movement of their rear ends sufficient to enable the operator to raise the plows from the ground when desired. Said beams diverge as they extend backward, resting upon the axle B, and connected firmly by means of the rear cross-bars, F G.

The standards M, to which the plows N are attached, are attached removably and adjustably to said beams E, as shown, and are braced and held in position by the rods $c\,d\,e\,f$. To one of said beams there is attached the lever P, which passes up through a slot in the seat, so that the driver can readily adjust the plows laterally by means thereof.

Beneath the seat S, and having supports in the vertical standards R which support the seat, there is arranged a roller or shaft, K, upon which, directly above the plow-beams, are fixed the drums L L, to which are attached one end of the chains, belts, or cords $m$, the other ends of which are suitably attached to the said beams E, so that by revolving said shaft K the plows are raised from the ground. Upon one end of said shaft is fixed a grooved wheel, J, provided with a handle, $h$, whereby the driver may revolve said shaft when desired, $n$ representing a sliding catch which enters a recess upon the side of said wheel to hold the plows up from the ground.

$b$ represents a chain or cord attached to the wheel J, and extending back in suitable rings or loops to the rear of the machine, so that the same operation may be accomplished when the operator is walking behind, if he should prefer at times so to do.

By the arrangement of the plow-beams as shown, pivoted to the draft-pole, resting movably upon the axle as a fulcrum, and extending back thereof, where the plows are attached thereto, the pressure of the earth upon the plows balances the machine and relieves the horses' necks from a downward pressure, and at the same time the depth of the plows in the soil is accurately gaged.

I claim—

Elevating and sustaining the beams E by means of the chains $m$, drums L, roller K, wheel J, cord $b$, and slide $n$, when all are arranged and operated substantially as described.

BENJAMIN F. KESSLER.

Witnesses:
W. E. MARRS,
L. L. COBURN.